United States Patent [19]

Pearce et al.

[11] 4,039,905

[45] Aug. 2, 1977

[54] ELECTRICAL DEVICE OF THE ELECTROLYTIC TYPE HAVING MEANS FOR CONFINING MOBILE ELECTROLYTE AND METHOD OF MAKING SAME

[75] Inventors: Godfrey R. Pearce; William J. Breeden, both of Glasgow, Ky.

[73] Assignee: P. R. Mallory & Co., Inc., Indianapolis, Ind.

[21] Appl. No.: 484,654

[22] Filed: July 1, 1974

[51] Int. Cl.[2] .............................................. H01G 9/00
[52] U.S. Cl. ..................................... 361/433; 29/570; 96/115 R; 357/72
[58] Field of Search .......................... 317/230; 29/570; 96/115; 357/72

[56] References Cited

U.S. PATENT DOCUMENTS

| 3,010,056 | 11/1961 | Kurland et al. | 317/230 |
| 3,261,902 | 7/1966 | Pearce et al. | 317/230 |
| 3,475,176 | 10/1969 | Rauner | 96/115 |
| 3,679,944 | 7/1972 | Yoshimura et al. | 317/230 |
| 3,684,927 | 8/1972 | Correll | 317/230 |
| 3,753,720 | 8/1973 | Kloczewski et al. | 96/115 |
| 3,766,443 | 10/1973 | Asakawa et al. | 317/230 |
| 3,863,116 | 1/1975 | Coniglio et al. | 317/230 |
| 3,940,667 | 2/1976 | Pearce et al. | 317/230 |

Primary Examiner—Andrew J. James
Attorney, Agent, or Firm—Hoffmann, Meyer & Coles

[57] ABSTRACT

An electrical device of the electrolytic type comprising an electrically insulating radiation semi-cured or cured polymer containing material over an electrical body to confine mobile electrolyte contiguous to the body. Preferably, the electrical body includes electrode means selected from the group consisting of stacked anode and cathode electrodes, or convolutely wound anode and cathode electrodes. Adjacent anode and cathode electrodes are separated by a suitable spacer, preferably paper and the like. The mobile electrolyte includes liquid and semi-liquid electrolytes.

The method of making the electrical device includes the steps of applying radiation curable polymer containing material to the electrical body containing the mobile electrolyte, and irradiating the applied polymer containing material to cure or semi-cure the material to confine mobile electrolyte contiguous to the body.

10 Claims, 3 Drawing Figures

U.S. Patent
Aug. 2, 1977
4,039,905
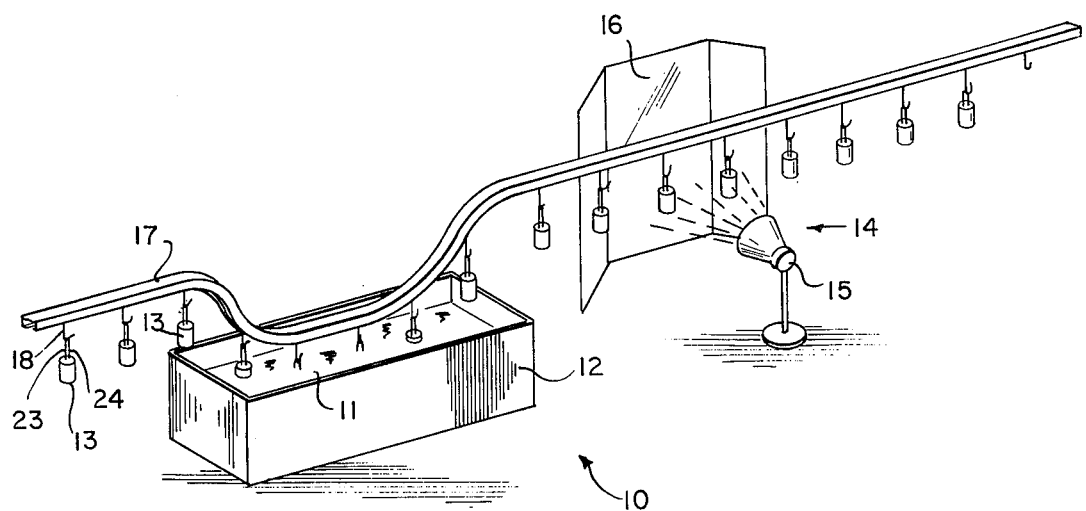
FIG. 1
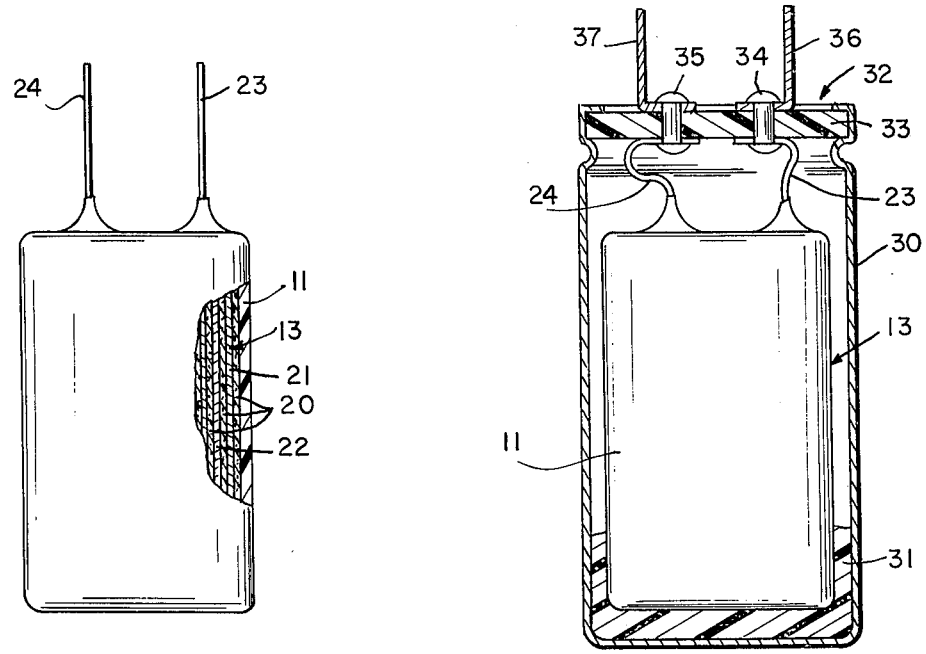
FIG. 2
FIG. 3

ELECTRICAL DEVICE OF THE ELECTROLYTIC TYPE HAVING MEANS FOR CONFINING MOBILE ELECTROLYTE AND METHOD OF MAKING SAME

The present invention relates to an electrical device of the electrolytic type, and to a method of making the same. More particularly, the present invention relates to an electrically insulating radiation semi-cured or cured polymer containing material over an electrical body to confine mobile electrolyte contiguous to the body, and to a method of making the same.

Electrolytic devices, such as electrolytic capacitors, have been jacketed with insulating materials in order to provide both a thermal and an electrical barrier between the capacitor body with its electrolyte, and a container housing the capacitor body-electrolyte combination. Generally speaking, a plurality of superposed layers of plastic material such as layers of polyethylene and ethylene terephthalate have been used to provide a cylinder having a radially inwardly extending lip. A disk composed of layers of polyethylene and ethylene terephthalate is inserted into the cylinder to engage with the end lip of the cylinder so as to close that end of the cylinder. A capacitor body with its mobile electrolyte is inserted into the cylinder and the cylinder is heated to a temperature to fuse the polyethylene of the superposed layers and shrink the ethylene terephthalate radially inwardly to provide a tight fitting jacket over the capacitor body. A purpose of the tight fitting jacket over the capacitor body is to provide a means by which mobile electrolyte contacting the capacitor body is confined within the jacket contiguous to the capacitor body. However, the area of the jacket between the lip of the cylinder and the disk may, on occasion, be discontinuous, as well as the formation of a slight discontinuity in radial shrinkage around the other end of the capacitor body. Either discontinuity in the jacket may, when the jacket is subjected to thermal cycling sufficient to cause some expansion and contraction of the jacket, provide a path through which mobile electrolyte contacting the capacitor body may leak. Upon contact of leaked electrolyte with the metal housing, the housing has a tendency to assume the electrical potential of such electrolyte. If such electrical potential has sufficient energy associated with it, it may cause a disruptive discharge of sufficient energy from the housing to adjacent articles at a different electrical potential to cause ignition of such articles or ignition of a surrounding ignitable atmosphere. At the very least, leaked electrolyte tends to have a harmful affect on the electrical characteristics of the capacitor.

One aspect of the present invention relates to an electrical device of the electrolytic type including an electrical body in a housing, a mobile electrolyte contacting the electrical body, and an electrically insulating irradiation semi-cured or cured polymer containing material over the electrical body to confine the mobile electrolyte contiguous to the body. The polymeric material is cross-linked or cured by exposure to high energy irradiation such as ultraviolet (UV) light or electron beam (EB) irradiation. An advantage of irradiation cured material over heat shrunken material is that the irradiation cured material provides a substantially continuous coating over the entire device body which confines mobile electrolyte contiguous to the capacitor body. The cured material is not harmfully affected by thermal cycling experienced by the electrical device, such as a capacitor, under typical operating conditions.

It is, therefore, a feature of the present invention to provide electrically insulating radiation semi-cured or cured material over an electrical body to confine mobile electrolyte contiguous to such body. A further feature of the present invention is to provide a method by which mobile electrolyte is confined to an electrical body by applying radiation curable polymer containing material to an electrical body containing the mobile electrolyte, and irradiating the applied polymer containing material to cure or semi-cure the material to confine the mobile electrolyte continguous to the body.

In the drawing:

FIG. 1 is a diagrammatic illustration of means for applying radiation cross-linkable polymer containing material to an electrical body and means for radiating a material applied to the electrical body to cross-link or cure the material;

FIG. 2 is an elevational view with portions thereof broken away, illustrating an electrical body made using, in part, the means illustrated in FIG. 1; and FIG. 3 is a cross-section of an electrical device wherein the electrical body of FIG. 2 is within a housing.

An illustration embodying one form of the concepts of the present invention is shown in FIG. 1. A means 10 is shown for applying and curing radiation curable material 11 applied from reservoir 12 to electrical bodies 13. The application of the radiation curable material to electrical bodies 13 is accomplished by immersing a body in radiation curable polymeric material 11 for the length of time required to apply the desired amounts of material 11 over the immersed external surfaces of the electrical body 13. The viscosity of the radiation curable polymeric material 11 may be varied to help control thickness thereof applied to the electrical body 13.

The electrical body 13 is then withdrawn from reservoir 12, and the body together with the irradiation curable material 11 applied to its surface is passed through radiation cross-linking or curing zone 14. Zone 14 includes an ultraviolet light source 15 for causing cross-linking curing of the material 11 applied to the surfaces of electrical body 13, and a reflector 16 to reflect back toward the electrical body ultraviolet light that initially passes by the electrical body 13. Ultraviolet light having a radiation in the wavelength range of about 3600 to about 3700 Angstrom (A) is emitted by source 15. A control panel (not shown) may be employed to regulate the "on" and "off" time of the ultraviolet light emitted by the source 15. An ultraviolet light source such as high pressure mercury lamp source suitably cures, in a few seconds, material 11 having a thickness of up to 250 mils applied to the body 13. The distance between the source 15 and the exposed surface of material 11 applied to electrical body 13 is about 1 to about 2 inches. If desired, the electrical body 13 may be rotated slowly about its vertical axis by hanger 18 while in front of source 15 in order to aid in more uniformly cross-linking the applied material 11.

Although the steps of immersing the electrical body 13 in the material 11 contained in the reservoir 12 may be accomplished by hand, in a production operation, it is generally more economical to perform such steps using automated techniques. One such technique illustrated in FIG. 1. FIG. 1 illustrates a conveyor track 17 from which is suspended a plurality of spaced hooks 18 for transporting electrical bodies 13 for immersion in material 11 and to zone 14 where the material applied to the bodies is cured. The valley in the conveyor track 17 causes the capacitor bodies 13 to be immersed in material 11, except for the tab-like means 23 and 24 projecting from the bodies 13. The capacitor bodies are withdrawn from the material 11 by the upward curve in the conveyor track 17 and transported to zone 14 for subsequent treatment. Other suitable means for applying material 11 to electrical bodies 13 include spraying, brushing, rolling and the like (not shown).

The polymeric material 11 applied to the surfaces of the electrical body 13 is of the type which has a high degree of mobile electrolyte confining ability upon curing and does not have a harmful affect on the desired electrical and physical relationships that exist between the mobile electrolyte and the electrical body under operating conditions. Such a polymer material is marketed by W. R. Grace & Co. of Columbia, Md., U.S.A. under type designation 4ll-D.

The radiation curable polymeric material 11 applied to the electrical body 13 may be any one of several suitable radiation cross-linkable polymeric materials capable of confining a mobile liquid or semi-liquid electrolyte contiguous to electrical body 13. For example, if ultraviolet light is used to cross-link applied polymeric material, suitable materials may be unsaturated polyesters, thermosetting acrylics, and urethane alkyds typically mixed with reactive monomers such as styrene, vinyl toluene or acrylics, and a suitable initiator. In the event electron beam radiation is used to cross-link the applied polymeric material 11 suitable materials may be unsaturated polyester, thermosetting and thermoplastic acrylics, urethanes and the like. It may be possible to modify the polyesters, acrylics and urethanes with epoxy, vinyl, silicone, fluorocarbons, polymers and the like. Typical monomers may include styrene, vinyl toluene, acrylics and the like. In the use of an electron beam to cross-link the applied polymeric material 11, the electron beam bombards the polymer with high energy electrons.

The construction of electrical body 13 may vay widely. The species shown in FIGS. 1, 2 and 3 of the drawing is of a convolutely wound paper type capacitor body 13 that includes one or more layers of Kraft paper 20 separating contiguous dielectric oxide film-forming metal anode and cathode foil electrodes 21 and 22. Suitable dielectric oxide film-forming metal electrodes include aluminum and tantalum. The paper 20 includes a mobile electrolyte such as a solution (not shown) of ammonium borate and boric acid with glycol. Other suitable mobile electrolytes are useable with the electrical body 13. The layers of paper 20, separating the anode and cathodes foil electrodes 21 and 22 respectively, are convolutely wound into a relatively tight roll to provide capacitor body 13. The anode electrode 21 includes anode terminal tab 23, and the cathode foil electrode 22 includes cathode terminal tab 24. Tab 23 and tab 24 project from the capacitor body 13. Terminal tab 23 is suitably connected to the anode foil electrode 21 of the convolutely wound capacitor body 13. Terminal tab 24 is suitably connected to a cathode foil electrode 22 of the convolutely wound capacitor body 13. U.S. Pat. No. 2,444,725 shows a convolutely wound paper type capacitor and discloses methods of making such capacitors.

FIG. 3 illustrates the electrolytic capacitor body 13 of FIG. 2 covered by an irradiation cured or hardened polymeric material 11. The cured material 11 over the body 13 provides a substantially continuous coating that helps confine mobile electrolyte contiguous to the capacitor body 13. The capacitor body 13 with cured material 11 is inserted into the open end of a cup shaped metal housing 30. A suitable metal for the housing is aluminum if the foil electrodes of the body 13 are aluminum. The rear of housing 30 contains tar 31 to help retain an end of the capacitor body 13 in fixed relation relative to the rear of the housing. A seal 32 including a disk-like configuration 33 of a rigid material such a phenolic or the like, and metal rivets 34 and 35 projecting thru the disk-like configuration 33 is positioned to close the open end of the housing 30. Anode terminal tab 23 is suitably coupled to the rivet 34 and cathode terminal tab 24 is suitably coupled to the rivet 35. Rivets 34 and 35 are connected to lugs 36 and 37, respectively. The edge of the cup shaped housing 30 is swaged or rolled-over to retain the seal 32 in fixed relationship relative to the housing 30 and capacitor body 13.

The following example is typical of a capacitor body 13 treated using the means 10 of FIG. 1.

EXAMPLE

An electrolytic paper type capacitor body 13 with alternate layers of paper spacer, such Kraft paper, and etched metal foil electrodes, such as an etched aluminum or tantalum foil, are convolutely wound into a relatively tight roll. Preferably, the anode electrode foil has a dielectric oxide film over the surfaces. The paper of the convolutely wound roll is impregnated with a suitable mobile electrolyte such as a solution including ammonium borate and boric acid with glycol. Capacitor bodies 13 are moved at the rate of about 1 foot per minute and immersed in material 11 in the reservoir 12 for a few seconds up to about 30 seconds. The material 11 in the reservoir 12 is ultraviolet light cross-linkable material is sold under type designation 411-D by W. R. Grace & C. of Columbia, Md. U.S.A. A capacitor body 13 is removed from the material 11, and the capacitor body 13 with applied material 11 is irradiated by ultraviolet light having a wavelength of about 3600 to about 3700 Angstrom (A) for up to about 30 seconds. The exposure of the material 11 to the ultraviolet cross-links the applied polymer material and provides the capacitor body 13 with a substantially continuous covering having a thickness of 250 mils. The covering 11 has good electrical insulation properties and functions to help confine mobile electrolyte contiguous to the body 13. A dye or dyes may be added to material 11 as long as the dye or dyes do not harmfully effect the ability of the material to cross-link when subjected to ultraviolet light.

The electrical device of the electrolytic type may be any one of several component bodies such as a capacitor, battery, and the like. The concepts of the present invention have particular applicability to electrolytic devices requiring the presence of a mobile electrolyte such as liquid or semi-liquid electrolyte. In the interest of a clearer showing, the concepts have been described with reference to a convolutely wound electrolytic paper type capacitor. Nevertheless, it should be appreciated that the concepts disclosed and claimed are also applicable to other types of electrolytic capacitors (including other types of paper capacitors such as stacked foil type electrolytic capacitors such as shown in U.S. Pat. No. 3,518,500, or where the paper is metallized or where a suitable plastic film is substituted for the paper) and mobile electrolyte containing electrical devices.

We claim:

1. An electrical device of the electrolytic type comprising an electrical body, mobile electrolyte contacting the electrical body, and a continuous coating of electrical insulating polymer containing material at least radiation semi-cured over the electrical body to confine mobile electrolyte contiguous to the body.

2. The electrical device of claim 1, wherein the mobile electrolyte is at least semi-liquid electrolyte.

3. A method making the electrical device of claim 1, including the steps of applying radiation curable polymer containing material to an electrical body contacted by mobile electrolyte, and irradiating the applied polymer containing material to at least semi-cure the material to confine the mobile electrolyte contiguous to the electrical body.

4. The method of claim 3, the further steps of placing a housing around the body and the polymer containing material.

5. The method of claim 3, wherein the step of applying radiation curable polymer containing material is selected from spraying, brushing and rolling material over the body, and dipping and immersing the body in material.

6. An electrical device of the electrolytic type comprising a housing, an electrical body in the housing, mobile electrolyte contacting the electrical body, a continuous coating of electrically insulating at least radiation semi-cured polymer containing material over the electrical body to confine mobile electrolyte contiguous to the body, and terminal means connected to the electrical body and projecting thru the housing.

7. The electrical device of claim 6, wherein the electrical body includes electrode means selected from the group consisting of stacked anode and cathode electrodes, and convolutely wound anode and cathode electrodes.

8. The electrical device of claim 7, wherein adjacent anode and cathode electrodes are separated by a dielectric.

9. The electrical device of claim 6, wherein the mobile electrolyte is at least semi-liquid electrolyte.

10. The electrical device of claim 6, wherein the housing includes an electrically conducting container with an open end and an electrically insulating means closing the open end of the container, the terminal means projecting thru the insulating means of the housing.

* * * * *